T. PRESSLY.
Seed-Planters.

No. 147,686.

Patented Feb. 17, 1874.

Witnesses:
A. W. Almqvist
J. Sedgwick

Inventor:
T. Pressly
Per Munn & Co
Attorneys.

UNITED STATES PATENT OFFICE.

THOMPSON PRESSLY, OF SWEET HOME, TEXAS, ASSIGNOR OF ONE-HALF HIS RIGHT TO D. E. HICKS.

IMPROVEMENT IN SEED-PLANTERS.

Specification forming part of Letters Patent No. 147,686, dated February 17, 1874; application filed November 8, 1873.

*To all whom it may concern:*

Be it known that I, THOMPSON PRESSLY, of Sweet Home, in the county of Lavacca and State of Texas, have invented a new and useful Improvement in Seed-Planters, of which the following is a specification:

The invention will first be fully described, and then pointed out in the claim.

Figure 1:
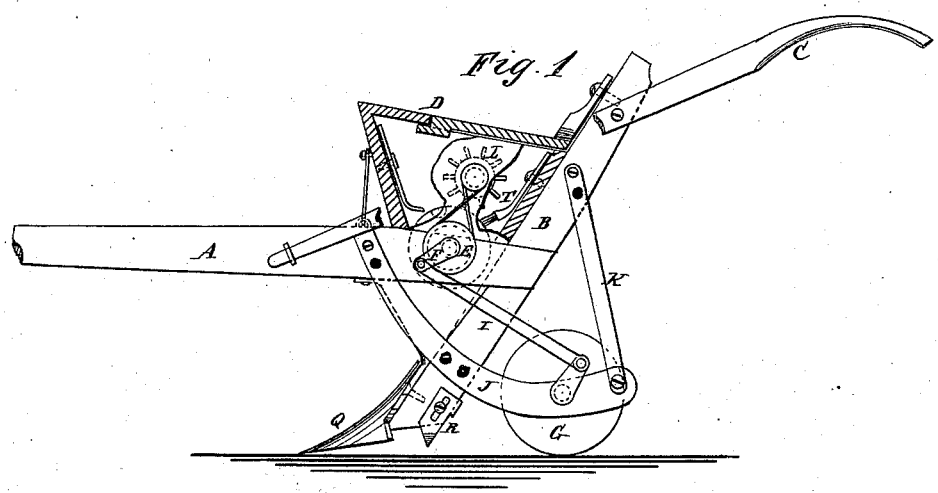
Figure 2:
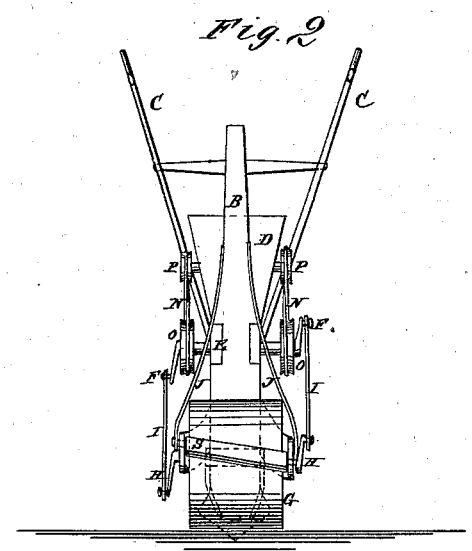

In the accompanying drawing, Figure 1 is a side elevation. Fig. 2 is an end elevation.

Similar letters of reference indicate corresponding parts.

A is the beam. B is the standard; C, the handles. D is the seed-box, in the bottom of which is a revolving dropper, E, the shaft of which extends through the box, and has a crank, F, upon each end. G is the roller, which runs upon the ground and presses the earth onto the seed. This roller has a shaft, upon the ends of which are cranks H H. These cranks are connected with the cranks F F of the dropper by the connecting-rods I I. The roller G is supported by the curved side bars J J and straps K. These curved side bars J and straps K are adjustable on the beam and standard, so as to throw the roller up or down. The friction of the roller on the ground rotates the agitator L in the seed-box by means of the bands N N on the pulleys O O and P P. Q represents the plow, which is attached to the end of the standard by means of slots and bolts, so that it can be raised or lowered, and thereby regulate the depth of furrow. R R are adjustable covering-plows in the rear of the main plow Q. S represents a scraper on the back surface of the roller. This scraper is supported by the projecting ends of the curved bars J J. (See Fig. 2.) T is a brush, which is placed in contact with the surface of the dropper. On the surface of the dropper are one or more cups or indentations which receive and carry the seed to the bottom, where it drops through the beam into a covered groove in the standard, and is conveyed to the furrow. This planter is simple and cheaply constructed, light and convenient to handle, and is well adapted for both uneven and smooth land.

Having thus described my invention, I claim as new and desire to secure by Letters Patent—

The combination, with dropper-shaft and roller-shaft connected by crank-arms and connecting-rods, of the plates J J adjustable with the roller G for regulating the depth of plows, but so that the distance between said shafts shall be always preserved, as and for the purpose set forth.

THOMPSON PRESSLY.

Witnesses:
   E. S. COOK.
   T. B. FOSTER.